United States Patent [19]

Seizert

[11] Patent Number: 5,020,687
[45] Date of Patent: Jun. 4, 1991

[54] FABRIC REINFORCEMENT FOR PLASTIC FUEL TANKS

[75] Inventor: Robert D. Seizert, Canton, Mich.

[73] Assignee: Solvay Automotive, Inc., Houston, Tex.

[21] Appl. No.: 479,081

[22] Filed: Feb. 12, 1990

[51] Int. Cl.⁵ .......................................... B60K 15/03
[52] U.S. Cl. .................................. 220/645; 220/461; 220/905; 264/516
[58] Field of Search ............... 220/460, 461, 1 B, 71, 220/72, 905, 644, 645, 454, 455; 215/1 C; 264/512, 515, 516

[56] References Cited

U.S. PATENT DOCUMENTS

| | | | |
|---|---|---|---|
| 3,426,940 | 2/1969 | Broerman | 220/644 |
| 3,470,907 | 10/1969 | Shockey | |
| 3,552,599 | 1/1971 | Redding | |
| 3,595,422 | 7/1971 | Durrett, Jr. | |
| 3,744,656 | 7/1973 | Schiemann | 215/1 C X |
| 3,951,190 | 4/1976 | Suter | 220/1 B |
| 4,024,975 | 5/1977 | Uhlig | 215/1 C |
| 4,122,142 | 10/1978 | Lawrence et al. | 264/516 |
| 4,342,799 | 8/1982 | Schwochert | |
| 4,379,099 | 4/1983 | Ota et al. | 264/25 |
| 4,416,303 | 11/1983 | Scheurenbrand | |
| 4,453,564 | 6/1984 | Bergesio | |
| 4,482,075 | 11/1984 | Stotz et al. | |
| 4,518,091 | 5/1985 | Scheurenbrand et al. | |
| 4,601,926 | 7/1986 | Jabarin et al. | 215/1 C |
| 4,602,722 | 7/1986 | Ives | |
| 4,625,980 | 12/1986 | Lyzohub | |
| 4,660,738 | 4/1987 | Ives | |
| 4,852,765 | 8/1989 | Lyzohub | 220/461 |
| 4,886,180 | 12/1989 | Bonczyk | 220/5 A |
| 4,903,854 | 2/1990 | Schiemann | 220/94 A |
| 4,910,054 | 3/1990 | Collette et al. | 428/35.7 |

FOREIGN PATENT DOCUMENTS 2110526  5/1987  Japan .................................. 264/512

Primary Examiner—Stephen Marcus
Assistant Examiner—Stephen K. Cronin
Attorney, Agent, or Firm—Willian Brinks Olds Hofer Gilson & Lione

[57] ABSTRACT

An improved plastic fuel tank for motor vehicle applications is disclosed. The blow molded plastic fuel tank has at least one reinforcement insert encapsulated at a preselected area on the exterior surface of the fuel tank. The reinforcement insert provides supplemental support, elasticity and fire resistance, or a combination thereof.

20 Claims, 2 Drawing Sheets

FABRIC REINFORCEMENT FOR PLASTIC FUEL TANKS

BACKGROUND AND SUMMARY OF THE INVENTION

The present invention relates to automotive fuel tanks and, in particular, to a plastic fuel tank having woven fabric reinforcements encapsulated on the exterior surface thereof.

Conventional automotive fuel tanks can be classified into two distinctive design approaches. The first, and most widely utilized design approach includes the fabrication of two or more metallic (i.e. steel) stampings which are roller (i.e. continuous) seam welded together to form a leak-proof tank. Likewise, metal fuel tanks are typically plated with a corrosion resistant metal (i.e. terne plate) which acts as a barrier against attack from corrosive gasoline ingredients. With recent government mandates directed to the elimination of lead as an octane boost additive in gasoline, it will be necessary for the industry to mix other additives such as methyl-alcohol or methanol with gasoline. Both are by-products of the gasoline distillation process and could be easily added to the gasoline end-product. However, such additives are extremely corrosive to conventional stamped metal fuel tanks.

Another known disadvantage of welded steel tanks is the need to produce leak-proof seams which are capable of withstanding impact as well as extremely high internal pressure levels without rupturing. Additionally, metal tanks do not, in and of themselves, provide adequate thermal insulation from excessive heat generated by adjacent exhaust system components. In some instances, an additional non-metallic shield member is provided between the tank and the exhaust system components to thermally insulate the steel tank, thereby reducing the transfer of heat from the exhaust components to the fuel confined within the tank.

The application of plastics in the fabrication of fuel tanks is the second design approach which has recently gained recognition in the automotive industry. In recent years, the selection of plastic as a material from which fuel tanks, particularly motor vehicle fuel tanks, can be fabricated has received increased interest. Plastic fuel tanks are typically less expensive than metal tanks, are easier to produce, and are more resistant to the deteriorating effects of gasoline and the environment. In addition, because plastic fuel tanks can be more readily formed into complex shapes, it is possible to specially configure plastic fuel tanks and thereby significantly increase the capacity of the tank for a given application. Moreover, plastic fuel tanks are more impact resistant than metal tanks and less prone to rupturing as the blow molding process does not produce seams which must be subsequently joined and sealed.

However, to ensure adequate strength of the fuel tanks, particularly with plastic fuel tanks having complex shapes, it is frequently necessary to fabricate the entire fuel tank with a greater average wall thickness than necessary to ensure appropriate wall thickness in those localized areas where the blow molding manufacturing process tends to cause thinning.

It is therefore an object of the present invention to provide an improved one-piece blow molded plastic fuel tank having fabric reinforcements encapsulated at localized points on the exterior surface of the tank. The fabric reinforcements provide additional mechanical strength, particularly at elevated temperatures. Furthermore, the fabric reinforcements are able to strengthen localized areas which have been "deep drawn" and where wall sections tend to be thinnest. Likewise, it is preferred to utilize material for such reinforcements that additionally provides a heat shield effect for thermally insulating the contents of the fuel tank from exhaust systems components.

It is an additional object of the present invention to provide a reinforced blow molded fuel tank that can be manufactured with a reduced average overall wall thickness thereby reducing the weight of the fuel tank without sacrificing the strength and integrity of the fuel tank.

Other advantages and features will become apparent from the following specification taken in connection with the accompanying drawings.

DETAILED DESCRIPTION OF THE PREFERRED EMBODIMENTS

Figure 1:
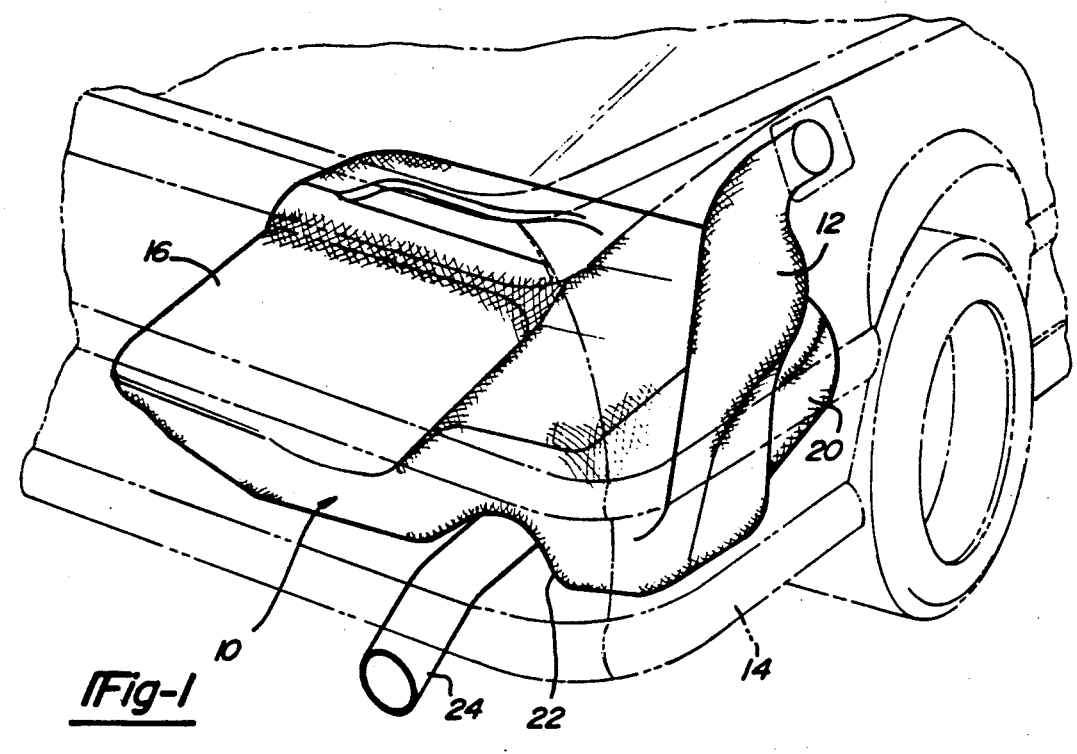
FIG. 1 is a perspective view of a one-piece blow molded plastic fuel tank shown in operative association with a representative vehicle.
Figure 2:
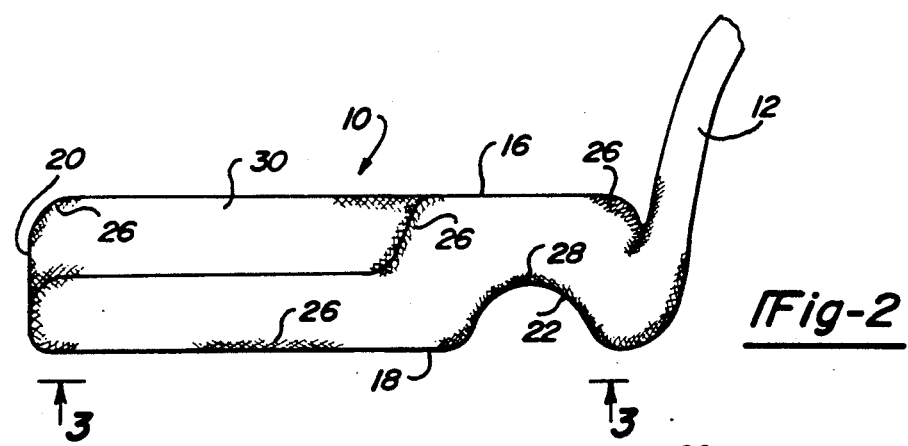
FIG. 2 is a side view of the fuel tank shown in FIG. 1 illustrating localized areas of fabric reinforcement in accordance with a preferred embodiment of the present invention.
Figure 3:
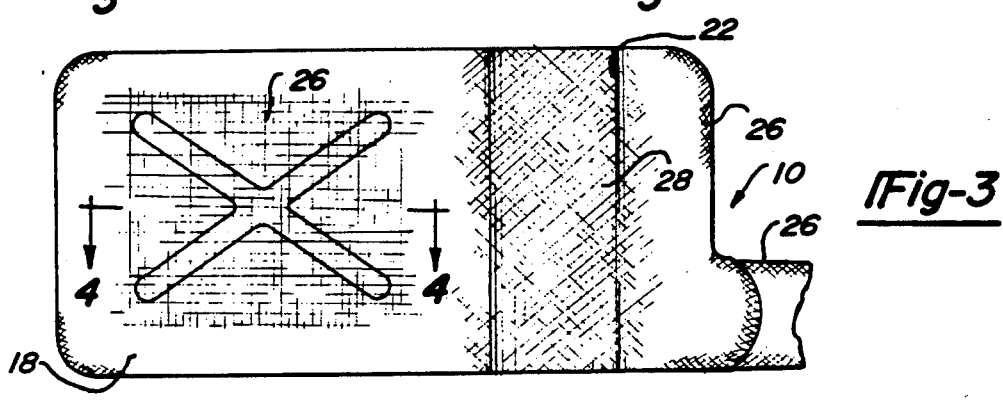
FIG. 3 is a bottom view of the fuel tank shown in FIG. 1 illustrating areas of localized fabric reinforcement for preventing sag and for providing improved thermal insulation from exhaust components.

Blow molded plastic fuel tanks fabricated from high density polyethylene (HDPE) are gaining popularity with automobile manufacturers because of their numerous fabrication and operational advantages over conventional steel fuel tanks. Blow molding of a one-piece, seamless plastic fuel tank eliminates potential fuel leakage problems associated with welded metal tanks and provides superior thermal insulation when placed in close proximity to exhaust components.

Blow molded HDPE fuel tanks must meet safety specifications that include drop testing from a height of 20 feet at a temperature of minus 40° F. The tank must also withstand intense flames for 2 minutes without leaking. It is known in the art that HDPE fuel tanks, while superior to metal tanks in many aspects, must still be protected from intense heat sources such as the exhaust system components. Accordingly, it is important to avoid areas of reduced cross-sectional wall thickness, especially at high stress locations.

To improve the characteristics of blow molded fuel tanks, the present invention includes the addition of one or more woven fabric reinforcement inserts that are supported in one or more preselected positions within the mold prior to the parison drop operation. During blow mold processing, the inserts are encapsulated on an exterior surface of the fuel tank so as to give the finished tank additional localized support and/or strength. The reinforcement inserts provide localized strengthening which improves the performance of the fuel tanks in burn tests, particularly in areas such as the corners near the top of the tank where the plastic normally is thinnest in cross-section. Furthermore, fabric reinforcement inserts permit an overall weight reduction via a reduction in the overall average wall thickness. This is due to the fact that the reinforcements obviate the need to increase the thickness of the tank in excess of that required in order to ensure adequate thickness in critical areas. Moreover, as will subsequently be explained in greater detail, the mechanical properties of the HDPE tanks are also significantly improved by the inclusion of the reinforcement insert.

Referring now to the drawings, a plastic fuel tank preferably fabricated via blow mold processing of high density polyethylene (HDPE) is generally designated by the reference numeral 10. Fuel tank 10 is a one-piece, seamless, hollow, pressurizable vessel having a filler neck 12. Fuel tank 10 is configured to include various structural recesses which are provided to permit direct attachment of fuel tank 10 to the underbody of vehicle 14. Fuel tank 10 is generally rectangular in shape and has a top surface 16, a bottom surface 18 and side walls 20. Bottom surface 18 includes an inward recess 22 configured to provide clearance for exhaust system components 24.

In accordance with the preferred embodiment of the present invention, two different fabric composites are used as reinforcement inserts and generally designated 26 and 28. The weave structure of inserts 26 and 28 differs to provide distinct characteristics which will be described in greater detail hereinafter. Generally, the inserts are positioned on the wall or draped in front of the wall of the mold prior to the parison drop and are encapsulated in a generally flush contiguous fashion with the external surface 30 of fuel tank 10. Preselective placement of reinforcement inserts 26 and 28 within the mold provides localized reinforcement for increased mechanical rigidity and strength. It is contemplated that insert 26 can be readily employed in localized areas such as "deep drawn" corner areas where wall sections are typically thin and in relatively unsupported locations such as the underside of the tank. Insert 26 preferably comprises a porous woven fabric having strands in one direction fabricated from a rigid or "strengthening" material and strands interwoven perpendicular thereto of a stretchable or "elastic" material. As such the fabric weave provides uni-directional strengthening characteristics along a first axis while providing flexural or expansive movement along a second orthoganol axis. Selective orientation of the weave within the mold controls the characteristics which insert 26 will produce once encapsulated in tank 10.

Figure 4:
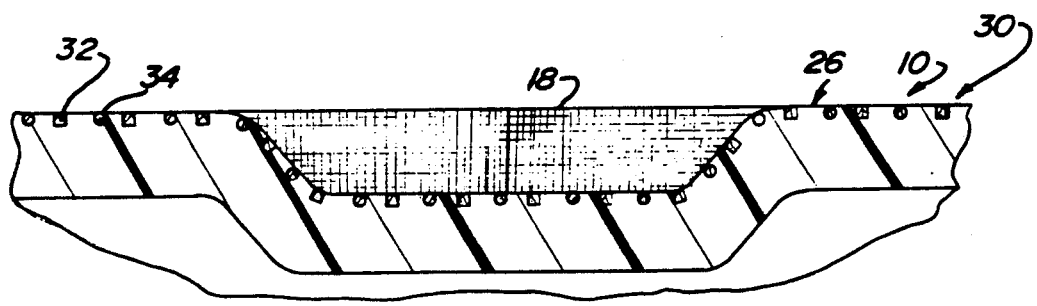
FIG. 4 is an enlarged cross-sectional view, taken along lines 4—4 of FIG. 3.

Preferably, insert 28 includes a porous weave of fabric having alternating strands of a "strengthening" fiber and a "flame retardant" or "flame depressant" fibrous material which foams when heated to provide an insulating flame barrier. More preferably, the "strengthening" fiber includes a nylon or glass fiber to provide the requisite strength. The "flame retardant" strands may comprise any known fire resistant material regardless of its ability to generate a foam barrier. In FIG. 4, insert 26 illustrates the weave fabric composition having a "strengthening" strand 32 alternating with an "elastic" strand 34. As such, additional protection against the intense heat generated by adjacent exhaust system components 20 is provided. Likewise, it is to be understood that any woven material which is capable of providing the desired reinforcing and/or insulative characteristics would be suitable according to the scope of the present invention.

According to the preferred embodiment, the method for reinforcing fuel tank 10 will now be described. Generally, the present invention comprises an improvement over conventional blow mold processing and includes a method of making a hollow body (fuel tank) of a plastic material (HDPE) in which a parison is expanded in a blow mold, and in which, during the course of the parison expansion process, wall portions of the parison penetrate between the alternating strands of a porous woven insert that has been selectively placed in the mold. More specifically, a mold configured to a definitive size and shape of the desired fuel tank is provided. The mold is initially opened to provide access to the interior surfaces thereof. Prior to the parison drop, a woven fabric reinforcement insert is preselectively positioned on a surface of the mold corresponding to the area of the finished fuel tank 10 to be reinforced. Alternatively, the insert can be draped or suspended within the mold relative to a preselected surface thereof. As previously detailed, the orientation of the fibrous insert within the mold determines the direction and degree of reinforcement provided. The woven insert material may be coated or impregnated with a bonding agent or compound to assist in providing adequate adhesion with the parison.

Reinforcement inserts are maintained in preselected positions upon the mold surface either through application of a vacuum or an adhesive or any other means known in the art. If a vacuum is provided, a suction-type clamping force maintains the reinforcement insert in the preselected position. Likewise, it is contemplated that an adhesive-type bonding material may be utilized which will not detrimentally react with the parison and will readily degrade during the blow molding process.

Once the fabric reinforcement insert has been oriented in its preselected position, parison is released to form a continuous generally cylindrical tube of the preferred resin material. Thereafter the mold is closed so as to "pinch off" the parison to provide top and bottom sealed surfaces. The mold is then pressurized to expand the parison against the inner walls of the mold. The respective wall portions of the parison penetrate the openings between the interwoven strands of porous reinforcement insert so as to encapsulate the insert relatively flush with exterior surface 30 of tank 10. More specifically, FIG. 4 illustrates the general inter-relationship between strands 32 and 34 of insert 26 and exterior surface 30 of fuel tank 10. Furthermore, it is preferable that any frayed ends of the strands of the inserts be completely encapsulated within the HDPE material. According to conventional blow molding process practices, the mold is then opened and the fuel tank 10 is removed therefrom. Fuel tank 10 then undergoes various finishing operations known in the industry for removing flashing or the like. Additionally, the inner wall surface within tank 10 is chemically treated, such as sulfination processing, to inhibit the corrosive effects of gasoline acting thereon.

It is contemplated that the reinforced pressurized vessel (i.e. fuel tank) could be fabricated from any plastic material other than HDPE which provides the requisite strength, flame resistance, and chemical resistance required for application to motor vehicle fuel tanks. Likewise, it is contemplated that any woven reinforcement material having adequate porosity to permit proper encapsulation and which is capable of providing the requisite strengthening and/or flame resistance can be utilized. Moreover, woven inserts possessing bidirectional rigidity or flexibility are preferred for particular applications.

The fuel tank illustrated in the drawings is for representative purposes only and the position, number and size of the insert shown should not be construed to limit the scope of the present invention. In short, localized areas determined to pose potential failure problems (i.e., premature rupture or leakage) can be effectively reinforced pursuant to the present invention.

An improved non-metallic fuel tank is described above. Those skilled in the art will appreciate that other advantages can be obtained from the use of this invention and that modifications can be made without departing from the true spirit of the invention. Furthermore, the foregoing description of the preferred embodiment according to the present invention are provided for purposes of illustration only and not for purposes of limitation—the invention being defined by the claims.

I claim:

1. A blow molded plastic fuel tank for use in motor vehicles comprising at least one reinforcement insert encapsulated on a preselected area of an exterior surface of said tank for providing supplemental support at said preselected area wherein said reinforcement insert comprises a porous fabric material having a weave defining a plurality of openings between interwoven strands in said fabric, said openings being substantially filled with said plastic so as to encapsulate said fabric material in generally flush relation to said exterior surface of said tank.

2. The blow molded plastic fuel tank of claim 1 wherein said fuel tank is fabricated from high density polyethylene.

3. The blow molded plastic fuel tank of claim 2 wherein said preselected area includes a localized area of said tank having a reduced wall thickness relative to the remainder of said tank.

4. The blow molded plastic fuel tank of claim 2 wherein said preselected area includes an unsupported underside portion of said tank.

5. The blow molded plastic fuel tank of claim 4 wherein said fabric material is a composite weave having a first strand made from a generally rigid material and a second strand made from a generally elastic material, said first and second strands interwoven in a generally transverse orientation so as to provide uni-directional localized strengthening of said preselected area of said tank along a first axis because of said first strand material and permitting expansion along a second axis because of said second strand material.

6. The blow molded plastic fuel tank of claim 4 wherein said fabric material further includes a third strand made from a fire resistant fibrous material interwoven with said first and second strands to provide thermal insulation against increased temperature conditions.

7. The blow molded plastic fuel tank of claim 4 wherein said fabric material is a composite weave having alternating strands of a relatively rigid fibrous material and a flame resistant material for application in localized areas requiring supplemental strength and thermal insulation.

8. The blow molded plastic fuel tank of claim 1 wherein said porous weave fabric comprises alternating strands of a strengthening fabric and flame retardant material.

9. The blow molded plastic fuel tank of claim 8 wherein said strengthening fiber comprises nylon or glass fiber.

10. The blow molded plastic fuel tank of claim 9 wherein said flame retardant material foams when heated to provide an insulating flame barrier.

11. A plastic fuel tank apparatus comprising:
a hollow one-piece fuel tank having a continuous wall portion fabricated from a blow molded plastic material; and
a reinforcement insert means for providing supplemental support to said fuel tank at preselected areas thereof, said insert means comprising a woven fabric insert defining a plurality of openings between interwoven strands of said fabric and being encapsulated along an exterior surface of said tank during blow mold fabrication of said tank.

12. The plastic fuel tank apparatus of claim 11 wherein said fuel tank is made from a blow molded high density polyethylene material.

13. The plastic fuel tank apparatus of claim 12 wherein said fabric reinforcement insert is a porous fabric material having a weave defining a plurality of openings between interwoven strands in said fabric, said openings being generally filled with said high density polyethylene so as to encapsulate said fabric in generally flush relationship with said external surface of said tank.

14. The plastic fuel tank apparatus of claim 13 wherein said fabric material is a composite weave having a first strand made from a generally rigid fibrous material and a second strand made from a generally elastic fibrous material, said first and second strands interwoven so as to provide uni-directional localized strengthening of said preselected area along a first axis because of said first strand and permitting elastic expansion along a second axis because of said second strand.

15. The plastic fuel tank apparatus of claim 14 wherein said fabric material further includes a third strand made from a fire resistant fibrous material interwoven with said first and second strands to provide thermal insulation against increased temperature conditions.

16. The plastic fuel tank apparatus of claim 13 wherein said fabric material is a composite weave having alternating strands of a relatively rigid fibrous material and a flame resistant fibrous material for application in localized areas requiring supplemental support and thermal insulation.

17. The plastic fuel tank apparatus of claim 11 wherein said woven fabric comprises alternating strands of a strengthening fabric and flame retardant material.

18. The plastic fuel tank apparatus of claim 17 wherein said strengthening fiber comprises nylon or glass fiber.

19. The plastic fuel tank apparatus of claim 17 wherein said flame retardant material foams when heated to provide an insulating flame barrier.

20. A blow molded plastic fuel tank for use in motor vehicles comprising at least one reinforcement insert encapsulated on a preselected area of an exterior surface of said tank for providing supplemental support at said preselected area, said preselected area comprising a localized area of said tank of a reduced wall thickness relative to the remainder of said tank.

* * * * *